(12) United States Patent
Thomas

(10) Patent No.: US 11,868,363 B2
(45) Date of Patent: *Jan. 9, 2024

(54) METHOD AND SYSTEM FOR PERSISTING DATA

(71) Applicant: Kinaxis Inc., Ottawa (CA)

(72) Inventor: Frank Thomas, Toronto (CA)

(73) Assignee: Kinaxis Inc., Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/697,317

(22) Filed: Mar. 17, 2022

(65) Prior Publication Data
US 2022/0253453 A1    Aug. 11, 2022

Related U.S. Application Data

(63) Continuation of application No. 16/088,149, filed as application No. PCT/CA2017/050330 on Mar. 14, 2017, now Pat. No. 11,308,115.

(60) Provisional application No. 62/307,889, filed on Mar. 14, 2016.

(51) Int. Cl.
| | |
|---|---|
| *G06F 16/25* | (2019.01) |
| *G06Q 10/06* | (2023.01) |
| *G06Q 10/10* | (2023.01) |
| *G06F 16/22* | (2019.01) |
| *G06Q 10/067* | (2023.01) |

(52) U.S. Cl.
CPC ........ *G06F 16/254* (2019.01); *G06F 16/2228* (2019.01); *G06F 16/25* (2019.01); *G06Q 10/06* (2013.01); *G06Q 10/067* (2013.01); *G06Q 10/10* (2013.01)

(58) Field of Classification Search
None
See application file for complete search history.

(56) References Cited

U.S. PATENT DOCUMENTS

| | | |
|---|---|---|
| 8,930,380 B1 | 1/2015 | Saurabh et al. |
| 8,978,034 B1 | 3/2015 | Goodson et al. |
| 9,665,621 B1 | 5/2017 | Reiner et al. |
| 10,424,020 B2* | 9/2019 | Kmak ................... G06Q 40/06 |
| 10,452,981 B1* | 10/2019 | Christie, IV ........... G06N 20/00 |
| 2003/0084053 A1 | 5/2003 | Govrin et al. |
| 2004/0083199 A1 | 4/2004 | Govindugari et al. |

(Continued)

OTHER PUBLICATIONS

Bornea et al., "Semi-Streamed Index Join for Near-Real Time Execution of ETL Transformations," Proceedings of the 2011 IEEE 27th International Conference on Data Engineering ICDE 2011, Apr. 2011, pp. 159-170.

(Continued)

*Primary Examiner* — Richard L Bowen
(74) *Attorney, Agent, or Firm* — Borden Ladner Gervais LLP; Curtis B. Behmann

(57) ABSTRACT

A method and system for persisting data are provided. Batch data is periodically extracted via a computer system from at least one primary data source. Batch data is transformed via the computer system. The batch data is loaded, via the computer system, into a database. Real-time data is continuously received from at least one secondary data source. The received real-time data is indexed in an index. Business intelligence reports are generated from both the real-time data in the index and the batch data in the database.

16 Claims, 4 Drawing Sheets

(56) References Cited

U.S. PATENT DOCUMENTS

| | | | |
|---|---|---|---|
| 2005/0251812 A1* | 11/2005 | Hayward | G06F 16/258 |
| | | | 719/328 |
| 2005/0262192 A1* | 11/2005 | Mamou | G06Q 10/10 |
| | | | 709/203 |
| 2005/0289138 A1 | 12/2005 | Cheng et al. | |
| 2007/0160067 A1* | 7/2007 | Hayward | H04L 67/56 |
| | | | 370/397 |
| 2008/0046536 A1 | 2/2008 | Broda | |
| 2011/0035744 A1* | 2/2011 | Bhatia | G06F 16/252 |
| | | | 717/174 |
| 2011/0301982 A1* | 12/2011 | Green, Jr. | G16H 40/67 |
| | | | 705/3 |
| 2011/0313969 A1 | 12/2011 | Ramu | |
| 2012/0102053 A1 | 4/2012 | Barrett et al. | |
| 2012/0143715 A1* | 6/2012 | Eshghi | G06Q 30/08 |
| | | | 705/26.3 |
| 2013/0185349 A1 | 7/2013 | Broda | |
| 2014/0289188 A1 | 9/2014 | Shimanovsky et al. | |
| 2015/0205602 A1 | 7/2015 | Prismon et al. | |
| 2016/0055499 A1 | 2/2016 | Hawkins et al. | |
| 2016/0162550 A1 | 6/2016 | Wang et al. | |
| 2017/0006135 A1 | 1/2017 | Siebel et al. | |
| 2017/0046409 A1* | 2/2017 | Bender | G06F 16/2455 |
| 2017/0076323 A1 | 3/2017 | Palanciuc et al. | |
| 2018/0084073 A1 | 3/2018 | Walsh et al. | |

OTHER PUBLICATIONS

European Search Report for 17765609.7, EPO, dated Sep. 6, 2019.
International Patent Application No. PCT/CA2017/050330, International Preliminary Report on Patentability dated Sep. 27, 2018.
International Search Report corresponding to PCT/CA2017/050330; Canadian Intellectual Property Office; dated Jul. 21, 2017.
Santos et al., "Real-Time Data Warehouse Loading Methodology," Proceedings of the 2008 International Symposium on Database Engineering & Applications IDEAS '08, Sep. 2008, pp. 49-58.
U.S. Appl. No. 16/088,149, Notice of Allowance dated Dec. 22, 2021.
U.S. Appl. No. 16/088,149, Final Office Action dated Feb. 9, 2021.
U.S. Appl. No. 16/088,149, Non-Final Office Action dated Jul. 23, 2021.
U.S. Appl. No. 16/088,149, Non-Final Office Action dated Jun. 19, 2020.
U.S. Appl. No. 16/088,149, Non-Final Office Action dated Nov. 6, 2020.
Written Opinion of the International Searching Authority corresponding to PCT/CA2017/050330; Canadian Intellectual Property Office; dated Jul. 21, 2017.

* cited by examiner

METHOD AND SYSTEM FOR PERSISTING DATA

This application is a continuation of U.S. patent application Ser. No. 16/088,149, filed Sep. 25, 2018, now allowed, which is a 371 of international PCT/CA2017/050330, filed Mar. 14, 2017, which claims benefit of U.S. provisional patent application Ser. No. 62/307,889, filed Mar. 14, 2016, the contents of which are incorporated entirely herein by reference.

TECHNICAL FIELD

The following relates generally to informatics and more specifically to a method and system for persisting data.

BACKGROUND

Business intelligence ("BI") systems are known. Such systems are used to acquire and transform raw data into meaningful and useful information for business analysis purposes. They are capable of handling large amounts of unstructured data to help identify, develop, and otherwise create new business opportunities. Such systems allow the data to be visualized in ways that provide insight into trends and other characteristics of the data.

Prior to analysis, the data is batch extracted from one or more data sources by an extract-transform-load ("ETL") engine and stored in a database, such as a flat file or a data warehouse. During the ETL process, data is extracted from the one or more data sources such as operational databases. The data sources may be homogeneous or may use different data structures and/or formats. Data validation may be performed during the extraction phase. Next, the ETL engine transforms the extracted data using a set of rules or functions to prepare it for loading into the data warehouse. Once the extracted data is transformed, it can then load the data into the database. During the loading of the data, the data in the repository may be overwritten, appended to, updated, etc.

As the ETL process can take a significant amount of time, and both the data sources and the data warehouse can suffer reduced performance, it is generally performed periodically, such as once a day, week, or month. As a result, the BI reports generated by the system are generally not current.

Current real-time data is often collected in a separate database and analyzed separately. Analysis of the aggregate data stored in the separate database together with the batch data can be quite manual and, as a result, can be very time-consuming and error-prone.

SUMMARY

In an aspect, a method for persisting data is provided, the method comprising periodically extracting batch data via a computer system from at least one primary data source, transforming, via the computer system, the batch data, loading, via the computer system, the batch data into a database, continuously receiving real-time data from at least one secondary data source, indexing the received real-time data in an index, and generating business intelligence reports from both the real-time data in the index and the batch data in the database.

In a particular case, the method further comprising storing the extracted batch data in an interim data store.

In another case, transforming the batch data comprises transforming the batch data into a format specified by a data schema.

In yet another case, transforming the batch data comprises at least one of discarding certain data, translating the data to account for differences in a representation of the data, determining the age of the data, sorting the data, joining the data where the data is from multiple sources, and aggregating the data.

In yet another case, the at least one primary data source does not publish or push the data immediately.

In yet another case, the method further comprising analyzing the data in the database for generating the business intelligence reports, the analyzing comprising at least one of statistical analysis, machine learning techniques, and data mining.

In yet another case, the method further comprising periodically reconciling the real-time data against the batch data.

In yet another case, the real-time data is acquired via at least one of REST requests and a user datagram protocol.

In yet another case, the real-time data is pushed onto a distributed message queue system.

In yet another case, the method further comprising storing the real-time data by key-value in a distributed key-value store for subsequent integration into the database.

In another aspect, there is provided a system for persisting data comprising one or more processors and a data storage, the one or more processors configured to execute, or direct to be executed: an extract-transform-load module to: periodically extract batch data from at least one primary data source; transform the batch data; and load the batch data into a database; a real-time distributed processing module to: continuously receive real-time data from at least one secondary data source; index the received real-time data to generate an index; and at least one business intelligence tool to generate business intelligence reports from both the real-time data in the index and the batch data in the database.

In a particular case, the extract-transform-load module further executable to store the extracted batch data in an interim data store.

In another case, transforming the batch data by the extract-transform-load module comprises transforming the batch data into a format specified by a data schema.

In yet another case, transforming the batch data by the extract-transform-load module comprises at least one of discarding certain data, translating the data to account for differences in a representation of the data, determining the age of the data, sorting the data, joining the data where the data is from multiple sources, and aggregating the data.

In yet another case, the at least one primary data source does not publish or push the data immediately.

In yet another case, the system further comprising a data analysis module executable to analyze the data in the database for generating the business intelligence reports, the analysis comprising at least one of statistical analysis, machine learning techniques, and data mining.

In yet another case, the at least one business intelligence tool periodically reconciles the real-time data against the batch data.

In yet another case, the real-time data is acquired by the extract-transform-load module via at least one of REST requests and a user datagram protocol.

In yet another case, the system further comprising a distributed message queue system, the extract-transform-load module pushes the real-time data onto the distributed message queue system.

In yet another case, the real-time distributed module stores the real-time data by key-value in a distributed key-value store for subsequent integration into the database.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
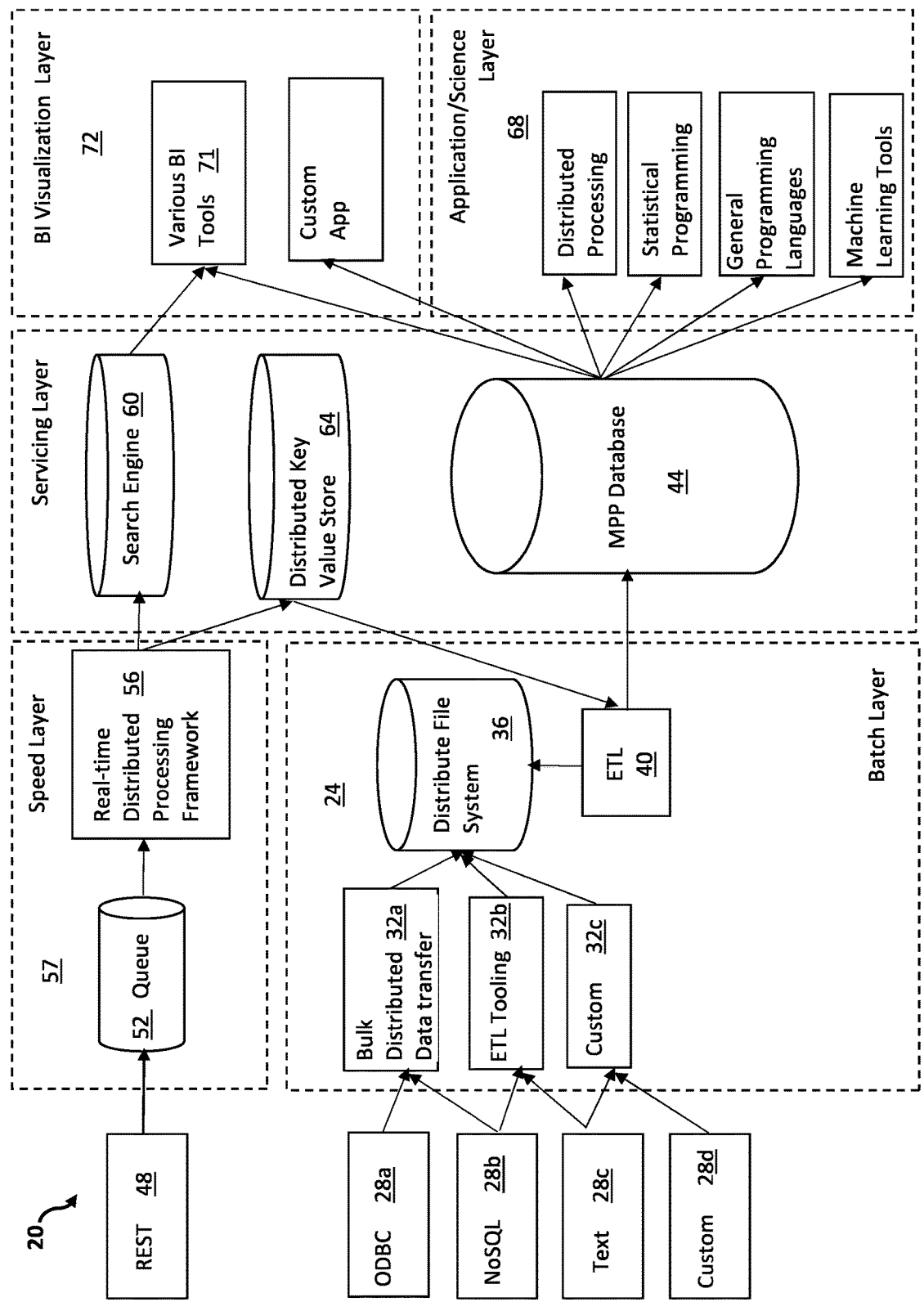
FIG. 1 is a schematic diagram of a system for persisting data in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to informatics and more specifically to a method and a system for persisting data. The method and system provides a method by which real-time data can be analyzed alongside data that is periodically extracted, transformed, and loaded in a batch. Real-time data is acquired as it is generated, typically via push.

Referring now to FIG. 1, a system 20 for persisting data in accordance with an embodiment is shown. The system 20 obtains both batch and real-time data from various data sources and stores the data to facilitate the consolidated reporting and visualization of the data. The system 20 acts as an end-to-end solution that is capable of consuming arbitrary data from various sources, transform it to a standard (but flexible) data model, and provides a means to consume the data from a BI reporting perspective, as well as provide a feature set with which to train machine learning models. The feature set is a set of data points used by a model. For example, the feature set can be a list of numbers that form a time series.

By combining real-time and batch data, the system 20 can leverage the advantages of each simultaneously. For example, real-time systems greatly reduce the time to insight or can be used in real-time predictions (e.g., if it is desired to make a recommendation as a user is browsing an e-commerce site). Batch systems are typically more correct than real-time systems. This is because real-time data may be lost, and there are no strong ordering guarantees for real-time data (e.g., events from a user browsing a website may not be processed in the same order as they occurred). By combining the storage and processing of both batch data and real-time data, analysts can be provided quicker access to fresh data and any data integrity problems can be resolved through the batch jobs.

The illustrated system 20 stores e-commerce transaction data. Real-time information may be coming in from a web beacon injected into webpages generated by an ecommerce store. When executed by a browser of a customer, the web beacon collects purchase information and submits it to the system 20 via REST calls. Transaction information is collected directly from the e-commerce platform, which is typically only extracted from the operational data stores, transformed, and loaded into a database, such as an analytical database, periodically.

The real-time information from the web beacon can be used to create visualizations that display sales volume by region as the sales happen, as well as run models against the incoming data for fraud detection, generate popups displaying product recommendations, and tailor the website for the user based on browsing patterns. When the data is stored, there may be some discrepancies due to the nature of using real-time data and systems. The real-time data can be reconciled against the batch data extracted from the e-commerce site on a schedule (e.g., nightly).

The system 20 includes an ETL module 24 that is in communication with a set of one or more data sources 28a to 28d. The data sources 28a to 28d (collectively 28) can be commercial or open-source databases, text files and sources, and any other data source type from which data can be extracted. In the illustrated embodiment, the data sources include an Open Database Connectivity ("ODBC")-compatible database 28a, a NoSQL database 28b (e.g., MongoDB, Cassandra, etc.) that is non-relational, a raw text file 28c hosted in any location (such as a file of comma-separated values on a hard drive), and a custom data source 28d, such as a web log or an analytics source. The data sources 28 are not real-time in nature, in that changes made to the data sources are not published or otherwise pushed immediately, and thus must be pulled from these data sources.

The ETL module 24 pulls or extracts data from the data sources 28 in batches via a set of data extraction tools 32a to 32c. These batch extractions are automatically performed periodically, typically daily or weekly at night to minimize the impact on the availability of the data sources 28.

The batch data extracted by the data extraction tools 32a to 32c is dumped into an interim data store 36. The batch data extracted from the data sources 28 is typically not reformatted in any way and, as a result, the format of the extracted data in the interim data store 36 is not markedly different than that of the data sources 28.

An ETL engine 40 then processes the data from each data source generally separately to transform the batch data into a format specified by a data schema for a database 44. Transformation scripts that are used by the ETL engine 40 to transform the batch data include a set of rules are used to specify the transformations to be applied. During the transformation, the batch data may be cleaned to filter out unwanted data. Examples of transformations performed may include the following functions: discarding certain data items, translating coded data items to account for differences in the representation of data between the data source and the data warehouse (for example, gender may be represented in a data source as "F" or "M", whereas it may be represented as "1" or "2" in the data warehouse), calculating data items such as age from the current date and a date of birth, sorting or ordering the data, joining data from multiple sources, aggregating data to generate a rollup, etc.

Once the extracted batch data is transformed, the ETL engine 40 loads the batch data into the database 44. The database 44 can be any one of a number of data store types that permits querying of the data stored therein, but in the illustrated embodiment is a massive parallel processing ("MPP") relational database. Preferably, the database 44 can scale horizontally, and has a shared nothing architecture (e.g., Greenplum).

The batch data from each data source 28 can be separately transformed and loaded into the database 44, or may be collectively loaded into the database 44 once transformed. During the loading of the batch data, the batch data in the repository may be overwritten, appended to, updated, etc.

The database 44 acts as the layer that makes the batch data accessible via queries.

The system 20 also acquires real-time data. The real-time data can be acquired from any data sources that are real-time in nature. In the illustrated embodiment, the system 20 acquires real-time data in the form of REST requests received via a RESTful web server 48. The REST calls can be sent via a JavaScript beacon inserted into a webpage for a web application or ecommerce website. These requests could contain any arbitrary bit of information such as web events, purchases, users interacting with a website, search queries, etc. As will be understood, the REST calls represent data that is pushed into the system 20 from other systems.

Data received via the RESTful web server 48 is pushed onto a distributed message queue system 52. The distributed message queue system 52 provides a means for many concurrent workers to crunch through the data simultaneously. It also enables a layer of reliability—if a message fails in transit or times out, the distributed message queue system 52 detects this and replays the message.

The messages in the distributed message queue system 52 are retrieved and processed via a real-time distributed processing framework 56 by a real-time distributed processing module 57. The real-time distributed processing framework 56 is a mechanism that can process data in a distributed fashion. The real-time distributed processing framework 56 can scale horizontally by simply adding additional workers.

The real-time distributed processing framework 56, on the real-time distributed processing module 57, processes data in the distributed message queue system 52 by providing the messages representing the real-time data to a search engine 60 and a distributed key-value store 64. The search engine 60 provides an easy mechanism to index fast moving data as well as produce simple aggregations in real-time, and is used to power real-time BI tools.

The distributed key-value store 60 stores the real-time data received for later integration into the database 44. An exemplary distributed key-value store is Apache Cassandra. Real-time data is stored by the distributed key-value store 60 by key-value. The advantage of using a key-value store is that if a message is processed multiple times, the key-store can identify and handle duplicates accordingly. Time series information can easily be stored in a key-value store as a specific time range can be specified to bucket the data as a key (e.g., minute, hour), the timestamp as a column (to keep the data sorted). All of the messages that occurred during that time frame can be retrieved in order by simply querying for that bucket.

Various data analysis modules 68 can process the data stored in the database 44 to summarize the data and draw inferences. The data analysis modules 68 can perform statistical analysis, machine learning techniques, data mining, or any other sort of data processing. The results generated by the data analysis modules 68 are then placed into the database 44 to enable the BI tools to access, process and/or present the results.

A BI visualization layer 72 includes at least one of business intelligence tools 71 for business intelligence, reporting, and/or visualization. These tools 71 enable a person to visualize the raw and processed batch data stored in the database 44 and the real-time data stored by the search engine 60. In this manner, the BI visualization layer 72 enables a person to visualize raw data, reports, visualization tools for both the batch data and the real-time data received by the system 20, as well as inferences generated by the data analysis modules 68 for the batch data.

The ETL engine 40 periodically (nightly in this embodiment) extracts data from the distributed key-value store 64 and places it in the interim data store 36. Next, the ETL engine 40 transforms the data from the distributed key-value store in the interim data store 36 into a format specified by the data schema for the database 44. Transformation scripts that are used by the ETL engine 40 to transform the batch data include a set of rules are used to specify the transformations to be applied to the real-time data. During the transformation, some real-time data items already available in the batch data can be discarded, as the batch data may be assumed to be more reliable. Other data items, such as user interactions with a website, are kept and aligned with the batch data in the database 44 via one or more common keys, such as purchase order number, etc. Then, the ETL engine 40 loads the transformed data into the database 44. In this manner, the database 44 is furnished with batch data from the data sources 28 and supplemented with real-time data received via the RESTful web server 48.

The system 20 uses batch data, which is generally more accurate/reliable than real-time data, where possible, and supplements the batch data with real-time data when batch data is unavailable.

Figure 2A:
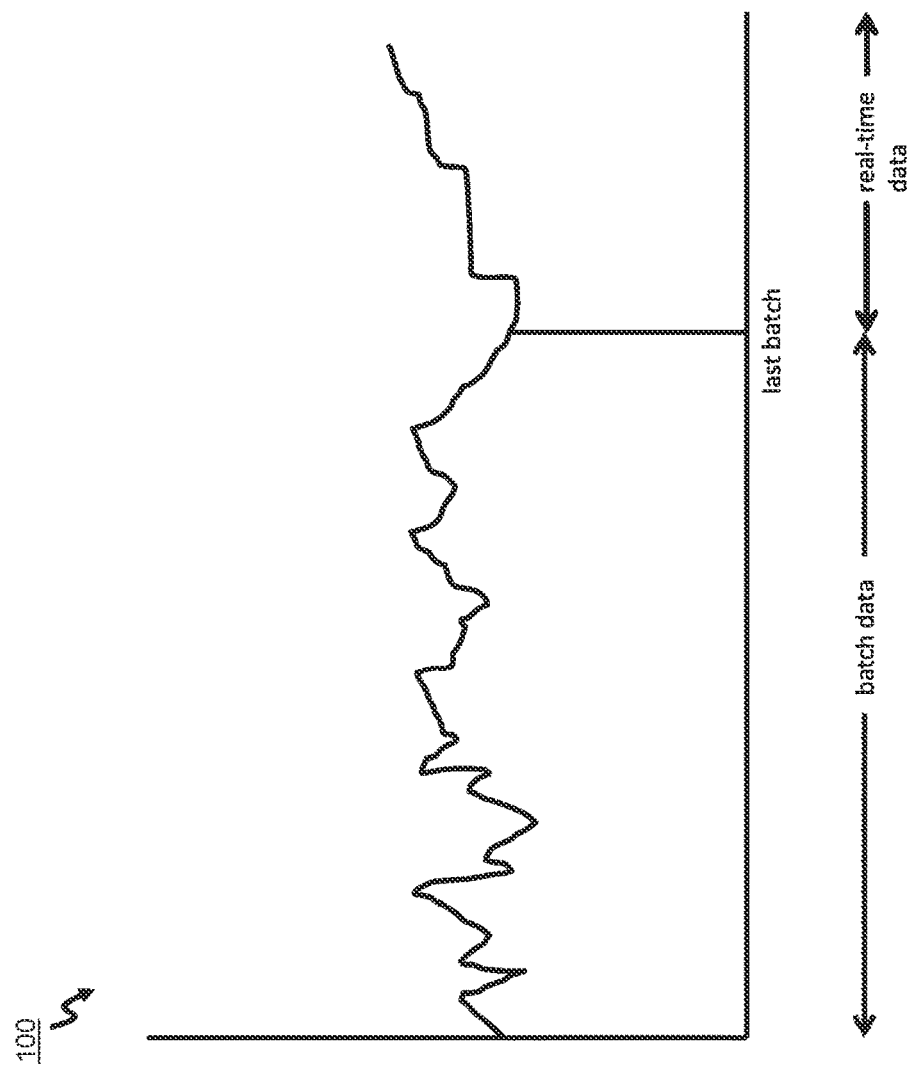
FIG. 2A is a view of the data persisted by the system of FIG. 1 generated using both batch data and real-time data.

FIG. 2A shows a chart 100 representing a view of the data generated by a visualization tool 71 in the BI visualization layer 72 of the system 20 of FIG. 1. As illustrated, the data includes both batch data from the database 44 for the period of time up to the last batch extraction from the data sources 28 and real-time data from the index managed by the search engine 60 for the period after this point.

Figure 2B:
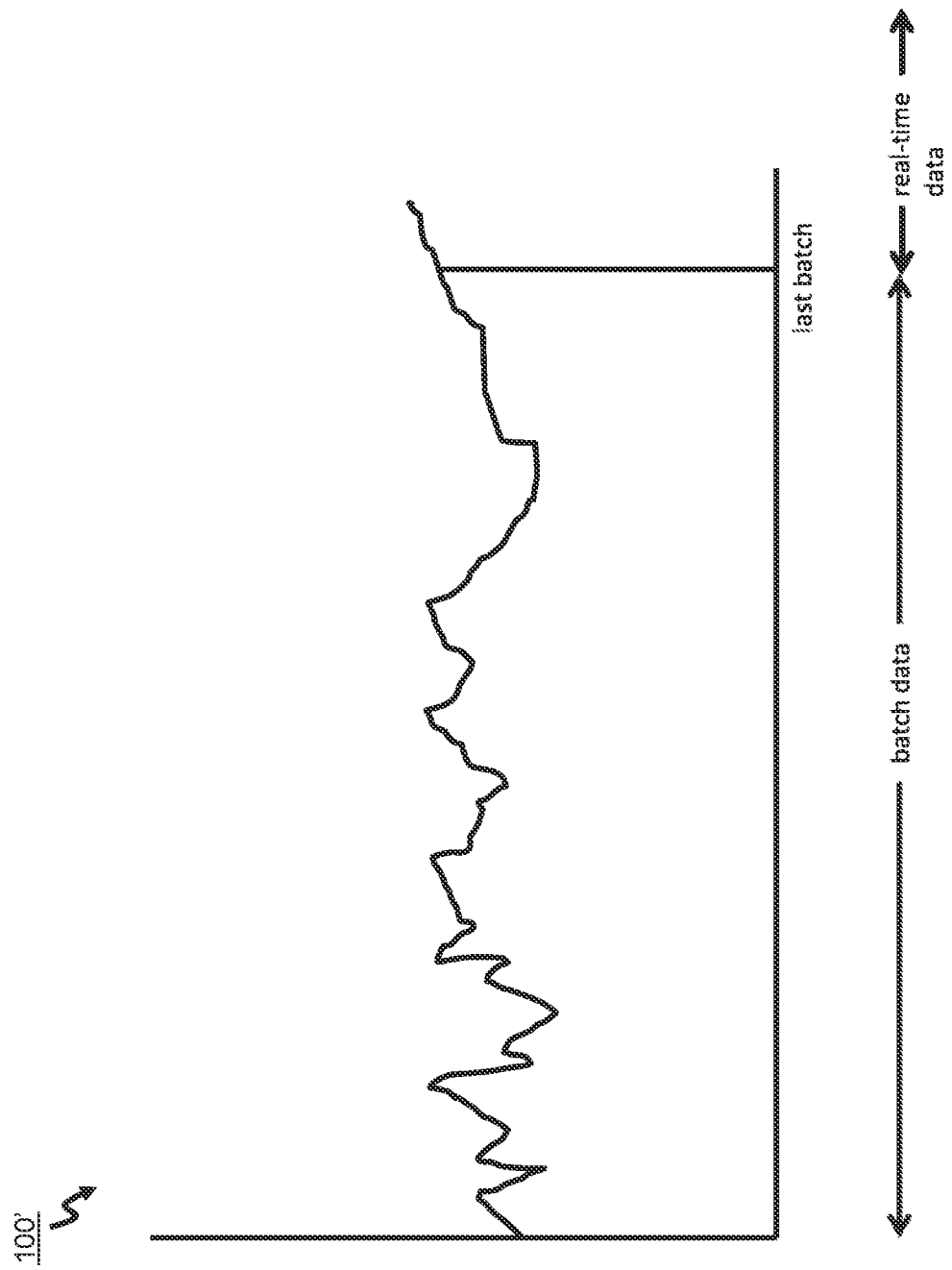
FIG. 2B is a view of the data persisted by the system of FIG. 1 similar to that of FIG. 2A, with the incorporation of further batch data.

FIG. 2B shows a chart 100' presenting the same view of the data generated by the visualization tool 71 of the BI visualization layer 72 of the system 20 shown in FIG. 2A, but includes additional batch data after a subsequent batch data extraction, transformation, and loading into the database 44. As can be seen, the batch data for the period since the last extraction to the newer extraction time replaces the real-time data for the same period, and real-time data from the index is used after this point.

Figure 3:
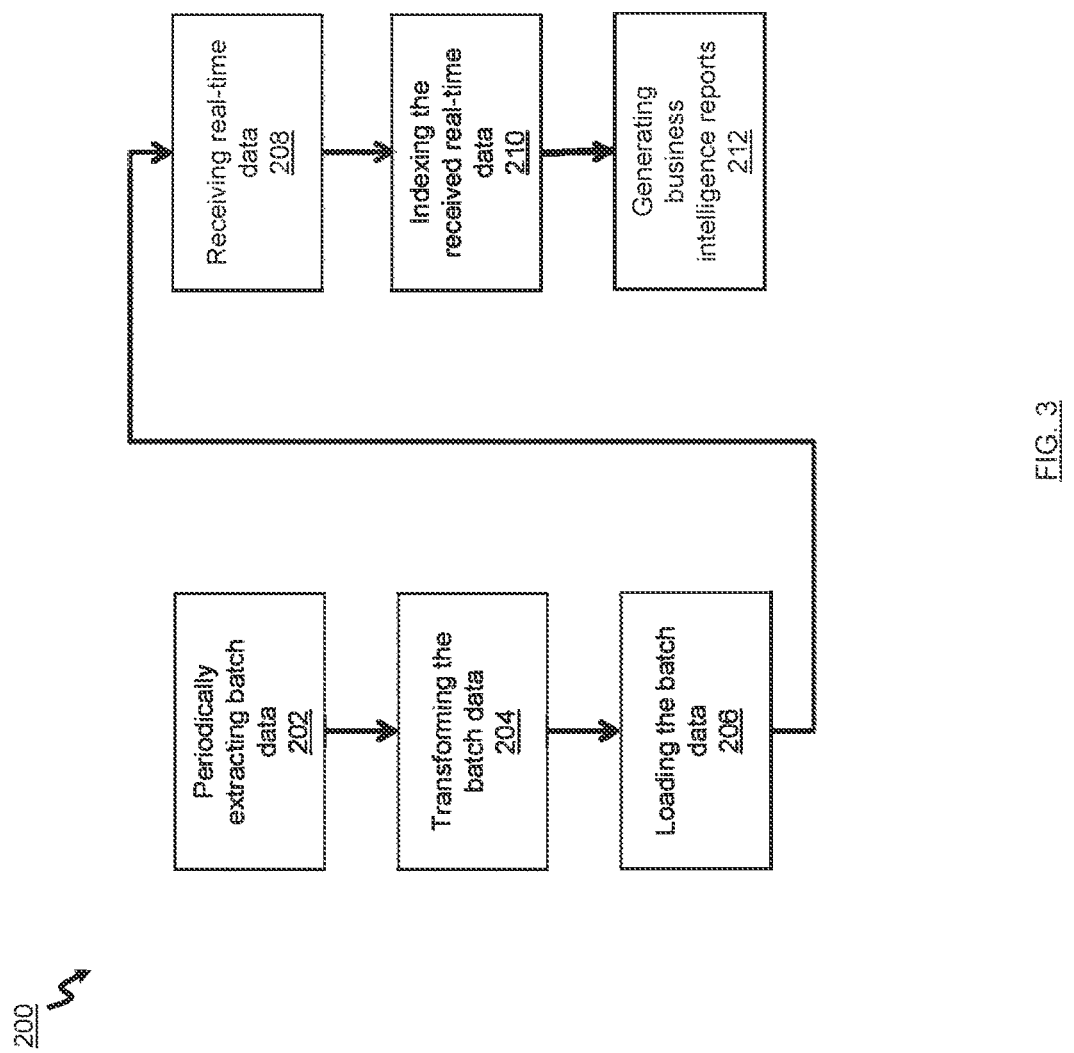
FIG. 3 is a view of the data persisted by the system of FIG. 1 similar to that of FIG. 2A, with the incorporation of further batch data.

FIG. 3 shows a chart 100' presenting the same view of the data generated by the visualization tool 71 of the BI visualization layer 72 of the system 20 shown in FIG. 2A, but includes additional batch data after a subsequent batch data extraction, transformation, and loading into the database 44. As can be seen, the batch data for the period since the last extraction to the newer extraction time replaces the real-time data for the same period, and real-time data from the index is used after this point.

The above approach reduces the deployment and maintenance burden, as there is one integrated system with a single management console rather than several for handling the different types of data. A standard interface for the application layer (data model) can be provided. Further, the approach is flexible, enabling users to rapidly build new use-cases for the system as well as iterate on existing ones. Flexibility is achieved through consolidating several technologies into one platform.

While the system described above uses a RESTful web server to receive real-time data, those of skill in the art will appreciate that there are numerous other solutions for receiving real-time data. For example, some systems can be configured to receive pushed data via user datagram protocol ("UDP").

The pushed data can be received from a variety of sources. Internet-enabled appliances, such as thermostats, set top boxes, home automation hubs, etc., as well as more traditional computing devices, such as desktop computers, servers, mobile phones, tablets, etc. can be configured to push data to the system.

In embodiments, the components of the system are stored by and executed on a single computer system or a single cluster of computers. In other embodiments, the components of the system 20 are distributed among two or more computer systems or clusters of computer systems that may be locally or globally distributed. The system provides a means for operating multiple types of database systems, data processing frameworks, operating systems, and hardware systems remotely. This management system oversees the computer system(s) or cluster(s) executing or storing the individual databases, search engine, ETL machines, etc. The management system makes calls to application programming interfaces ("APIs") of these subsystems and/or modifies their configuration (either through files or via an API) in order to perform tasks such as backups, configuration modification, etc. In addition, the management system can use third-party monitoring tools and expose them through the console.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for persisting and reconciling one or more data sources on a computer system, the method comprising:
   periodically extracting batch data from at least one primary data source,
   transforming the batch data into a first format specified by a data schema for a database;
   loading the transformed batch data into the database
   continuously receiving real-time data from at least one secondary data source;
   indexing the received real-time data to generate an index;
   transforming the real-time data into the first format, wherein transforming the real-time data comprises discarding any real-time data that is available in the batch data;
   loading the transformed real-time data into the database;
   generating business intelligence reports comprising the real-time data in the index, the transformed real-time data in the database, the extracted batch data and the transformed batch data in the database; and
   storing the real-time data by key-value in a distributed key-value store for subsequent integration into the database, wherein transforming the real-time data comprises transforming the real-time data stored in the distributed key-value store.

2. The method of claim 1, further comprising storing the extracted batch data in an interim data store.

3. The method of claim 1, wherein transforming the batch data comprises at least one of discarding certain data, translating the data to account for differences in a representation of the data, determining the age of the data, sorting the data, joining the data where the data is from multiple sources, and aggregating the data.

4. The method of claim 1, wherein the at least one primary data source does not publish or push the data immediately.

5. The method of claim 1, further comprising analyzing the data in the database for generating the business intelligence reports, the analyzing comprising at least one of statistical analysis, machine learning techniques, and data mining.

6. The method of claim 1, further comprising periodically reconciling the real-time data against the batch data.

7. The method of claim 1, wherein the real-time data is acquired via at least one of REST requests and a user datagram protocol.

8. The method of claim 1, wherein the real-time data is pushed onto a distributed message queue system.

9. A system for persisting and reconciling one or more data sources, the system comprising one or more processors and a data storage, the one or more processors configured to execute, or direct to be executed:
an extract-transform-load module to:
periodically extract batch data from at least one primary data source;
transform the batch data into a first format specified by a data schema for a database; and
load the transformed batch data into the database;
a real-time distributed processing module to:
continuously receive real-time data from at least one secondary data source; and
index the received real-time data to generate an index;
transform the real-time data into the first format, wherein transforming the real-time data comprises discarding any real-time data that is available in the batch data;
load the transformed real-time data into the database;
store the real-time data by key-value in a distributed key-value store for subsequent integration into the database; and
transform the real-time data by transforming the real-time data stored in the distributed key-value store, and
at least one business intelligence tool to generate business intelligence reports comprising the real-time data in the index, the transformed real-time data in the database, the extracted batch data and the transformed batch data in the database.

10. The system of claim 9, the extract-transform-load module further executable to store the extracted batch data in an interim data store.

11. The system of claim 9, wherein transforming the batch data by the extract-transform-load module comprises at least one of discarding certain data, translating the data to account for differences in a representation of the data, determining the age of the data, sorting the data, joining the data where the data is from multiple sources, and aggregating the data.

12. The system of claim 9, wherein the at least one primary data source does not publish or push the data immediately.

13. The system of claim 9, further comprising a data analysis module executable to analyze the data in the database for generating the business intelligence reports, the analysis comprising at least one of statistical analysis, machine learning techniques, and data mining.

14. The system of claim 9, wherein the at least one business intelligence tool periodically reconciles the real-time data against the batch data.

15. The system of claim 9, wherein the real-time data is acquired by the extract-transform-load module via at least one of REST requests and a user datagram protocol.

16. The system of claim 9, further comprising a distributed message queue system, the extract-transform-load module pushes the real-time data onto the distributed message queue system.

* * * * *